March 24, 1970 — R. M. GRAY — 3,502,351
SWAY CONTROL DEVICE FOR TRAILERS
Filed Aug. 1, 1968

INVENTOR.
Russell M. Gray
BY
Russell, Chittick & Pfund
ATTORNEYS

United States Patent Office 3,502,351
Patented Mar. 24, 1970

3,502,351
SWAY CONTROL DEVICE FOR TRAILERS
Russell M. Gray, Lynn, Mass., assignor to Gardner Reynolds, Peabody, Mass.
Filed Aug. 1, 1968, Ser. No. 749,529
Int. Cl. B60r 27/00; B60d 1/00
U.S. Cl. 280—446             2 Claims

ABSTRACT OF THE DISCLOSURE

A device connected between a trailer and a towing vehicle to give complete control. The device consists of a cylinder and piston assembly pivotally attached at one end to the towing vehicle and at the other end to the trailer in a position laterally offset from the towing axis. An adjustable split collar on the cylinder promotes frictional resistance between the cylinder and the piston to thereby control sway of the trailer. The split collar may be adjusted for greater or lesser friction consistent with the desire for turning, as well as sway control.

Background of the invention

This invention relates to towing devices and particularly to devices for controlling or preventing sway in a trailer being towed by a towing vehicle, usually by means of a ball or pivot-type hitch.

Prior art devices of this type usually embody relatively expensive complex constructions directed to a multitude of functions. These prior art devices, by reason of their complexity and high cost, are not well suited for family use with small to medium sized trailers.

Brief summary of the invention

The present invention comprises a complete control device mounted between a trailer and a towing vehicle. An extensible arm comprising a hollow cylinder and a rod or piston carried internally therein is pivotally connected at its respective ends to the trailer and the towing vehicle. The connecting points are laterally offset to one side of the towing axis. A friction inducing device such as a split collar is attached to the cylinder for resisting movement of the piston relative to the cylinder. By adjusting the tightness of the collar, accommodation can be made for various degrees of control, as well as for wear of the collar and rod in the areas of frictional contact therebetween.

Description of the preferred embodiment

Figure 1:
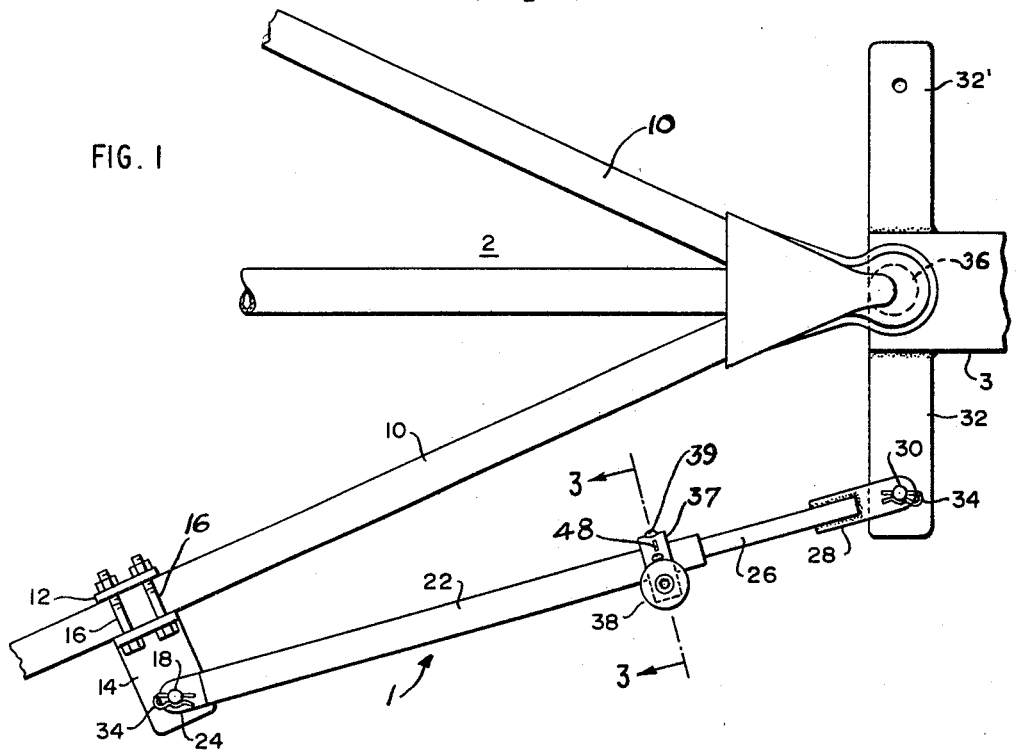
FIGURE 1 is a plan view of the device mounted between a trailer and a towing vehicle.
Figure 2:
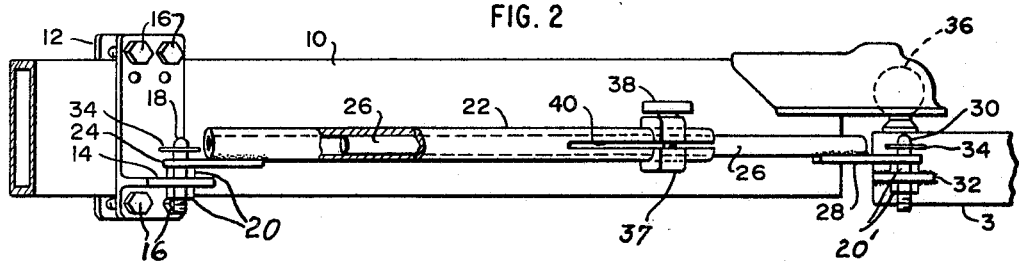
FIGURE 2 is a side view of the apparatus shown in FIG. 1.

Referring to FIGURES 1 and 2, the device generally indicated by the reference numeral 1 is shown attached between a trailer 2 and towing vehicle represented by a hitch 3. Attachment of the device to the trailer is accomplished on one of the converging tongues 10 of the trailer by clamping the tongue 10 between a plate 12 and a bracket 14. Four bolts 16 sufficient to force these clamping members together. A first pivot pin 18 is vertically secured on the bracket 14 by nuts 20. A cylinder 22 is pivotally connected at one end to pin 18 by means of a plate 24 which drops over pin 18 and rests on the uppermost nut 20. Plate 24 may be secured to cylinder 22 by any convenient means such as for example welding. A piston 26 is slidably contained in cylinder 22 and has a second plate 28 secured to its exposed end. A second pivot pin 30 is secured to a bracket 32 extending laterally from the hitch 3. The second pivot pin 30 also may be attached by two nuts 20' as in the case of the first pivot pin 18. Both plates 24 and 28 are prevented from accidental dislocation from their respective pivot pins by cotter pins 34. The second pivot pin 30 is offset from the pivot ball 36 of the trailer hitch 3 so that when the trailer and the towing vehicle are in line the device is laterally offset from an axis through the center of the pivot ball 36.

Figure 3:
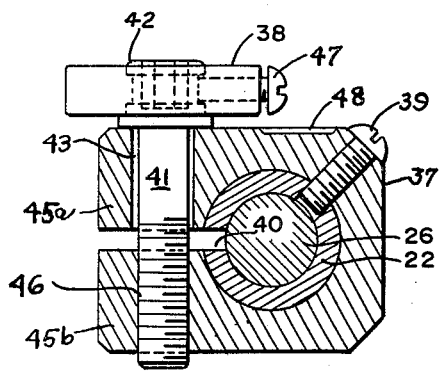
FIGURE 3 is a sectional view taken along line 3—3 of FIG. 1.
Figure 4:
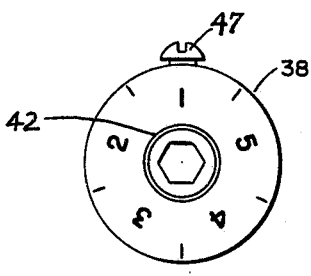
FIGURE 4 is an enlarged plan view showing the index dial on the split collar.

Referring now to FIGURES 3 and 4, frictional resistance to relative sliding movement between the cylinder 22 and the piston 26 is adjusted by a split collar 37. In the embodiment herein illustrated, collar 37 is attached to cylinder 22 by a set screw 39 or other means. As can be best seen in FIGS. 2 and 3, the wall of cylinder 22 is split as at 40. A bolt 41 extends vertically through a hole 43 in the upper ear 45a of split collar 37 to be threaded as at 46 in the lower ear 45b. A numbered dial 38 is secured to the head 42 of bolt 41 by means of a set screw 47. By tightening bolt 41, the ears 45a and 45b of split collar 37 are drawn together, thus causing an increase in the frictional resistance to relative movement between rod 26 and cylinder 22 in the area of split 40. A reference mark 48 on collar 37 enables a user to repeat appropriate settings when desired.

The split collar 37 may be adjusted by turning the dial 38 either by hand or with a wrench, in which case the collar may be knurled or provided with flats for a positive grip. A second bracket 32' may be provided on the opposite side of the trailer hitch 3, thus permitting the device to be installed on either side of the towing axis.

Having thus described a preferred embodiment of the invention, its uses and advantages will now be reviewed briefly. Swaying of a trailer or comparable towed vehicle may result from a number of causes, as for example wind, uneven loading of the trailer, changes in road camber, and passing of trucks and busses. The present invention inhibits such swaying by a counteracting mechanical moment determined by the tightness of the split collar 37 and the amount of lateral offset of the device from the towing axis. Normal turning of the towing vehicle and trailer results in similar pivoting which is a primary purpose of a ball type hitch. The adjustability of the sway control device is aimed at compromising between the need to control sway and the need to turn the vehicle.

By making the collar very tight, a relatively stiff tractor-trailer connection results between the trailer and the towing vehicle. This setting is appropriate on express highways where sharp turns are rarely encountered and where any sway could be dangerous. On more sharply curved roads, the collar would be loosened somewhat, permitting easier sliding of piston 26 in cylinder 22. On back roads such as those found in camping areas, where the vehicles operate at very slow speeds, the collar could be left loose so that the vehicles could be steered easily and frequent sharp turns made without causing excessive wear to the various components.

It is my intention to cover all changes and modifications of the example of the invention herein chosen for purposes of the disclosure which do not constitute departures from the spirit and scope of the invention.

I claim:
1. For use between a trailer and a towing vehicle to which the trailer is pivotally connected by means of a trailer hitch, a sway control device comprising a piston and cylinder assembly connected at one end to said vehicle at a point spaced laterally from said hitch, the other end of said assembly being connected to the frame of said trailer at a point spaced laterally from the towing axis, a plit collar on said cylinder through which said piston extends axially, means for adjusting the size of the passageway defined by said collar to frictionally resist axial movement between said cylinder and piston, and indexing means provided with said adjusting means to facilitate resetting any frictional adjustments desired.

2. A sway control device for use between a trailer and towing vehicle to which the trailer is pivotally connected by means of trailer hitch, the said device comprising: a first bracket fixed to said trailer and extending laterally therefrom on one side of the towing axis; a second bracket fixed to said towing vehicle and extending laterally therefrom on the same side of the towing axis; a cylinder pivotally connected at one end to one of said brackets, the said cylinder containing an axially movable piston rod, the distal end of which is pivotally connected to the other of said brackets; a slot in the wall of said cylinder at the other end thereof; a split collar surrounding said cylinder at said slit; means for tightening said split collar to thus tighten the slit portion of said cylinder with a resulting increase in frictional resistance between said cylinder and piston; and indexing means secured to said tightening means to facilitate resetting any frictional adjustment desired.

References Cited

UNITED STATES PATENTS

| | | | |
|---|---|---|---|
| 516,739 | 3/1894 | Jeffery | 287—58 |
| 669,389 | 3/1901 | Gundry. | |
| 1,527,981 | 3/1925 | Kimball. | |
| 3,294,421 | 12/1966 | Mathisen | 280—446 |
| 3,354,991 | 11/1967 | Kenworthy | 188—67 |
| 3,379,456 | 4/1968 | Bogie | 280—446 |

FOREIGN PATENTS

| | | |
|---|---|---|
| 1,490,600 | 6/1966 | France. |

LEO FRIAGLIA, Primary Examiner

U.S. Cl. X.R.

116—28; 188—67; 287—58